United States Patent [19]

Gerber et al.

[11] Patent Number: 4,689,534

[45] Date of Patent: Aug. 25, 1987

[54] ELECTRICALLY DRIVEN HAND-OPERATED TOOL

[75] Inventors: Hans Gerber, Luterbach; Markus Reber, Zollikofen, both of Switzerland

[73] Assignee: Scintilla AG, Solothurn, Switzerland

[21] Appl. No.: 540,092

[22] Filed: Oct. 7, 1983

Related U.S. Application Data

[63] Continuation of Ser. No. 489,610, May 3, 1983, abandoned, which is a continuation of Ser. No. 147,089, May 7, 1980, abandoned.

[30] Foreign Application Priority Data

Jun. 28, 1979 [DE] Fed. Rep. of Germany ....... 2926111

[51] Int. Cl.⁴ ....... H02P 5/16

[52] U.S. Cl. ....... 318/305; 310/47; 310/50

[58] Field of Search ....... 200/5 A, 5 D, 5 E; 177/121

[56] References Cited

U.S. PATENT DOCUMENTS

| | | | |
|---|---|---|---|
| 3,969,721 | 7/1976 | Chadwick et al. | 340/815.13 |
| 4,085,337 | 4/1978 | Moeller | 307/115 |
| 4,088,855 | 5/1978 | Emery | 200/16 A |
| 4,090,116 | 5/1978 | Lippitt | 318/345 E |
| 4,249,117 | 2/1981 | Leukhardt et al. | 318/27 J |
| 4,407,692 | 10/1983 | Torbeck | 156/350 |
| 4,447,786 | 5/1984 | Saar et al. | 318/811 |

*Primary Examiner*—William M. Shoop, Jr.
*Assistant Examiner*—Saul M. Bergmann
*Attorney, Agent, or Firm*—Michael J. Striker

[57] ABSTRACT

The electrically driven hand tool such as hand-operated drilling, milling or sawing machine includes a universal driving electromotor controlled via electric circuits by means of a plurality of switches, the control elements of which are in the form of pushbuttons arranged in a matrix or rectangular array on the top surface of the tool housing. The pushbuttons are illuminated when actuated and include a digital keyboard connected to a microprocessor to enter digital data corresponding to the desired value of speed or torque, and the microprocessor adjusts, via a power circuit, the electromotor to the entered data.

7 Claims, 4 Drawing Figures

ELECTRICALLY DRIVEN HAND-OPERATED TOOL

This is a continuation, of application Ser. No. 489,610, filed May 3, 1983 now abandoned which in turn is a continuation of application Ser. No. 147,089 filed May 7, 1980, now abandoned.

BACKGROUND OF THE INVENTION

The present invention relates in general to electrically driven hand-operated tools such as hand-operated drilling, milling or sawing machines and the like, preferably a combination tool for a home repairman, and in particular it relates to a tool having a housing defining a handle and within the housing a driving electromotor and means for presetting and/or adjusting various modes of operation of the tool such as the rotary speed, the direction of rotation and the torque.

In known tools of this type the presetting and adjusting switches are in the form of rotary control knobs or toggle switches mounted on the housing of the tool. In contemporary designs of such tools the tendency is to provide for the user more and more possibilities for setting various operations of the driving electromotor, such as the rotary speed, the rotary direction and the like in order to adjust the electrically driven tool to different working conditions in an optimum manner thus to provide for an improved utilization of the tool. Such increased setting possibilities considerably improve the result of the working operation and the work done by such tools has a better quality. Nonetheless, the multiplicity of such setting possibilities necessitates an excessive number of control elements which confuses frequently the user and may cause quite opposite results than intended, namely that by faulty adjustments and by the lack of possibility to quickly check the actual setting on the tool during the working process there may arise troubles of breakdowns which may endanger both the user and the function of the tool and produce impaired working results. As a consequence, due to the susceptibility of conventional hand-operated tools of the afore-described type to misadjustments or to errors in setting the working condition of the driving electromotor, the user is discouraged by the large number of control possibilities and does not make any use of them either at all or uses the setting possibilities in an insignificant manner only.

SUMMARY OF THE INVENTION

It is, therefore, a general object of the present invention to overcome the aforementioned disadvantages.

More particularly, it is an object of the invention to provide an improved electrically driven hand-operated tool of the above-described type which considerably improves the working comfort of the user.

Another object of this invention is to provide such a hand-operated tool which has a considerably increased working safety both for the user and for the tool itself.

In keeping with these objects and others which will become apparent hereafter, one feature of the invention resides, in an electrically driven hand-operated tool of the above-described type, in the provision of presetting and adjusting means for a plurality of modes of operation on the driving electromotor which include a plurality of control switches, the control elements of which are arranged in the form of a matrix located on a surface portion of the tool housing opposite the handle.

This matrix-like arrangement of control switches on the top surface of the hand tool results in an easily observable controlling and checking field which the user of the tool never loses from sight and can always make an optimum adjustment of the working condition of the tool or of its driving electromotor without the necessity to inspect a large number of identifications of respective switches. Moreover, the matrix-like arrangement of the control switches enables an instantaneous visual evaluation of the preset value during the operation of the tool. In other words, as soon as the worker starts the operation he is immediately informed by the switching matrix about the preset condition of the driving electromotor. It cannot happen therefore that if the user intends to start a drilling operation, for example, at a low rotary speed that upon activation of the tool an excessively high speed takes place which might result in damage to the hand tool or of the processed workpiece. At the same time, the safety of the user is improved because, by minimizing the chance of missetting the tool such as, for example, the direction of rotation of the motor which, for example, when a combined hand tool is used as a milling or sawing machine, a considerable danger of injury of the user is avoided. The control arrangement for the electrically driven hand-operated tool of this invention provides therefore not only an improved manipulation during the presetting and adjustment of the operational condition of the tool, but also an improved operational safety and protection of the tool.

In the preferred embodiment of this invention, the switches are in the form of pushbuttons provided with illumination elements which are energized synchronously with the activation of the corresponding switch. The means for presetting and adjusting the plurality of modes of operation of the electromotor are preferably electronic digital circuits such as a microprocessor with corresponding switching and control logic connected between the switching matrix and the driving electromotor. The presetting and adjusting means also includes at least one relay for reversing the direction of rotation of the motor.

The novel features which are considered as characteristic for the invention are set forth in particular in the appended claims. The invention itself, however, both as to its construction and method of operation, together with additional objects and advantages thereof, will be best understood from the following description of specific embodiments when read in connection with the accompanying drawing.

DESCRIPTION OF THE PREFERRED EMBODIMENTS

Figure 1:
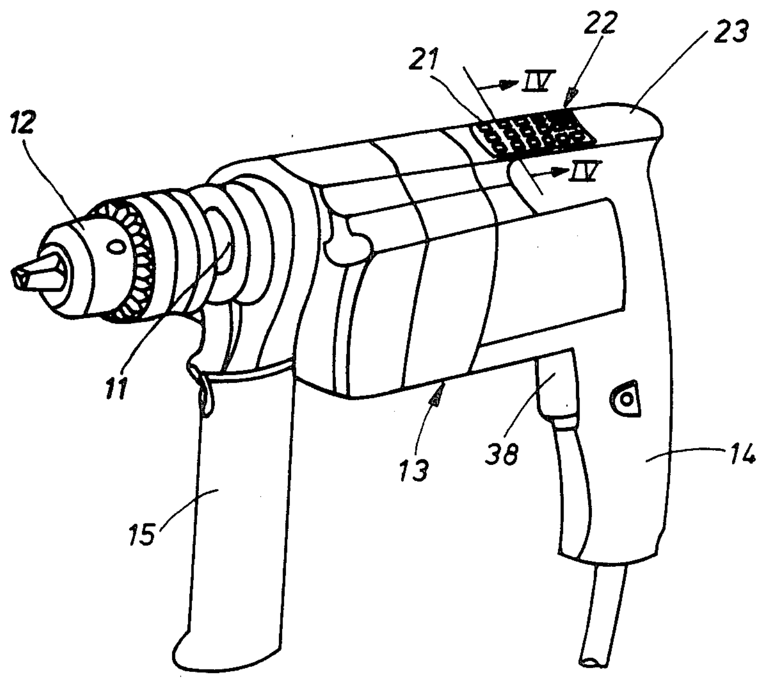
FIG. 1 is a perspective view of an electrically driven hand-operated drilling tool according to this invention.
Figure 2:
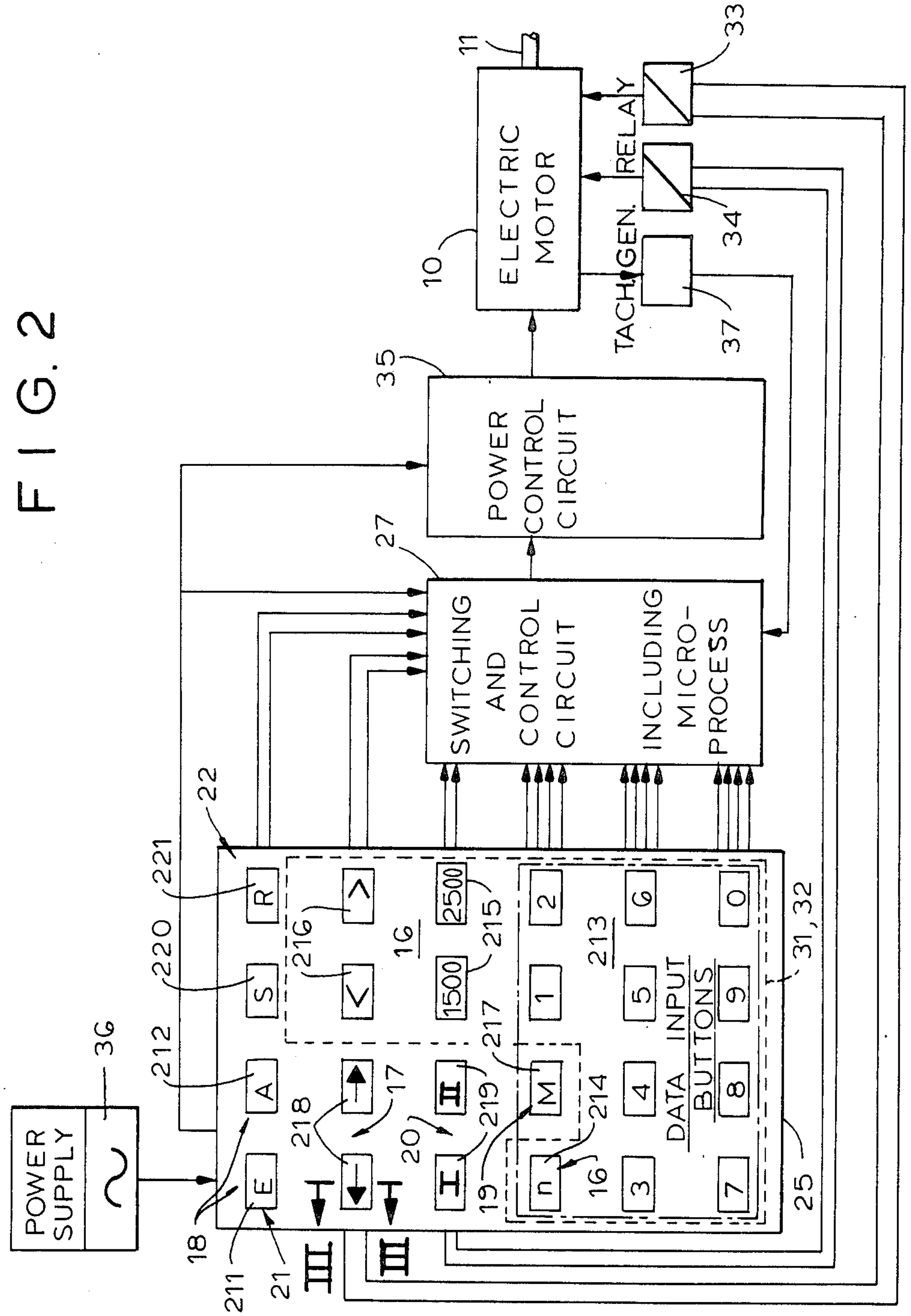
FIG. 2 is a block diagram of presetting and adjusting means for a driving electromotor of the tool of FIG. 1, including the switching matrix of this invention.

Referring firstly to FIGS. 1 and 2 there is illustrated as an example of the electrically operated hand tool of this invention a hand-held drilling machine having a housing 13 provided at its lower surface with a projecting handle 14. Within the housing 13 there is arranged a driving electromotor 10 preferably a universal motor which cooperates in a conventional manner with mechanical precision gears to transmit its torsional moment to a drilling spindle 11 provided with a chuck 12 for clamping a drill bit. To facilitate the drilling operation the housing 13 can be provided with an additional hand grip 15 secured to the front portion of the housing in proximity to the drilling spindle 11.

Figure 4:
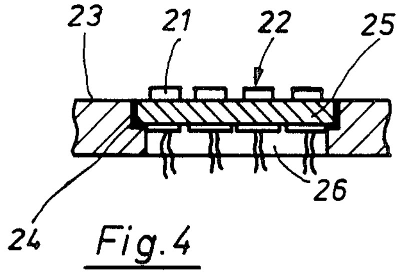
FIG. 4 is a cutaway sectional side view of the switching matrix of this invention taken along the line IV—IV in FIG. 1.

According to this invention, the hand drilling machine has a plurality of switches for presetting or directly or indirectly adjusting the working conditions of the tool. For example, reference numeral 16 indicates a group of function switches assigned for presetting or adjusting the rotary speed, function switches 17 control the direction of rotation of the drilling spindle, function switches 18 control the main power supply, function switch 19 is assigned for presetting the torque control of the motor, and the function switches 20 control the transmission. All the groups of function switches 16 through 20 are provided with pushbuttons 21 arranged in a rectangular array of rows and columns to form together a switching matrix 22. This switching matrix 22 is arranged on the top surface 23 of the housing 13 opposite the handle 14. As seen from FIG. 4, the top portion 23 of the housing is provided with a stepped recess 24 in which the matrix 22 is inserted as a separate structural unit. The individual pushbuttons 21 of the matrix 22 are mounted in a plate 25 which rests on the step in the recess 24 and firmly engages the walls of the recess. Electrical connections to respective pushbuttons 21 pass through the open bottom 26 of the recess 24 and are connected via a switching and control electrical 27 circuit which includes a microprocessor or to different relays located in the interior of the housing 13.

Figure 3:
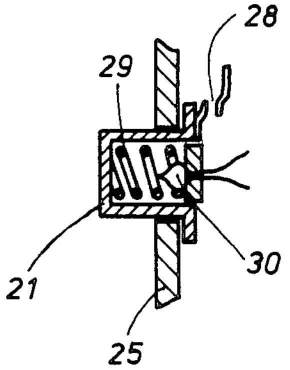
FIG. 3 is a cutaway sectional side view of an illuminated pushbutton in the switching matrix taken along the line III—III in FIG. 2.

As schematically indicated in FIG. 3, each pushbutton 21 has an electrical contact 28 which upon the depression of the pushbutton 21 closes the circuit against the force of a resetting spring 29. The pushbutton has the configuration of a hollow body of a transparent material which, apart from the resetting spring accommodates also an illumination element preferably in the form of a light emitting diode 30. The light emitting diode 30 is connected to the circuit 27 in such a manner as to remain energized even after the pushbutton 21 has been released and in this manner the diode visually indicates to the user the preset operational condition of the hand drill.

The group of power supply switches 18 for energizing or deenergizing the driving electromotor 10 includes two pushbuttons 211 and 212. The pushbutton 211 controls the energization of the electromotor 10 and the pushbutton 212 control the deenergization.

The group of switches 16 for presetting the rotary speed of the tool includes a data input keyboard 31 forming part of the matrix 22 and in this example amounts to eleven keys or pushbuttons 21. Ten pushbuttons of the keyboard designated generally by reference numeral 213 in FIG. 2 are assigned to digits 0 through 9. The eleventh pushbutton of the keyboard 31 designated by reference numeral 214 and indicated by n is used for presetting the rotary speed control. The whole keyboard 31, that means the ten pushbuttons 213 and the pushbutton 214, are electrically connected to the switching and presetting circuit 27 which includes a microprocessor. The function of the microprocessor is set in such a manner that upon actuation of the separate speed presetting pushbutton 214 and upon subsequent compression of a selected pushbutton 213, the desired rotary speed of the drill can be preselected. If, for instance, the user wants to preset the speed n=1500, he must at first compress the speed pushbutton 214 and thereupon four pushbuttons 213, namely the pushbuttons "1", then the pushbutton "5", and thereupon two times the pushbutton "0".

In addition, the rotary speed presetting group 16 includes also two pushbuttons 215 which are also electrically connected to the switching and presetting circuit 27. By means of the two pushbuttons 215, one of two fixed rotary speeds can be selected which, upon actuation of one of the pushbuttons 215, is applied via the microprocessor 27 to the driving motor. For example, upon compressing the pushbutton 215 indicated by numeral "1500" the motor starts rotating at a rotary speed n=1500. The speed presetting switching group 16 of the matrix 22 also includes two pushbuttons 216 which are also connected to the electromotor via the presetting and controlling circuit 27 in such a manner that upon actuation of one of these three buttons an increasing or decreasing continuous speed control of the electromotor 10 takes place.

The switching group 19 of the matrix 22 for preselecting the torque of the driving motor employs the same keyboard 31 as the speed controlling part 16 with ten pushbuttons 213 and an eleventh pushbutton 217 indicated by M. The latter pushbutton M is interconnected with the microprocessor 27 in such a manner as to switch over the keyboard 31 from the speed presetting function into a torque presetting function. In other words, upon actuation of the torque presetting pushbutton 217 and upon the subsequent preselection of the desired torque by compressing corresponding pushbuttons 213 the electromotor 10 becomes limited to this preset torque at the previously set rotary speed. In this embodiment the part 213 of keyboard 31 for presetting the speed is identical with the keyboard 32 for presetting the torque but it is also possible, if desired, to use separate keyboards 31 and 32.

The switching group 17 of the matrix 22 includes two pushbuttons 218 of which one is designated by an arrow directed to the left and the other by an arrow directed to the right. Both pushbuttons 218 as indicated in FIG. 2, are connected to relays 33 and 34 which reverse the motion of the electromotor. If desired, the relays 33 or 34 can be also controlled through the switching and adjusting circuit 27.

The transmission gears are controlled by the switching group 20 which includes as many pushbuttons 219 as many shifts or transmission ratio changes are available. In the given example, the hand drill has two transmission stages I, II controlled by corresponding two pushbuttons 219. The pushbuttons 219 control the mechanical gears via the electrical contact 28 (FIG. 3) connected to the relay 34 which in turn shifts the gears to the desired transmission stage. Even in this case it is possible to control the mechanical shifting of the gears to the switching and adjusting circuit 27 which activates a solenoid for controlling the gears.

The switching and adjusting circuit and microprocessor 27 cooperates with an electronic power control circuit 35 connected to the power source 36 and supplying to the electromotor 10 the driving voltages and currents adjusted in response to the control signals from the circuit 27. If it is desired to maintain constant the speed of the driving motor 10 at different loads there is also provided a tacho generator 37 coupled between the electromotor and the circuit 27 to provide a signal corresponding to the actual value of the rotary speed whereby the microprocessor compares this actual value with a preset desired value and generates a corresponding signal to the power control unit 35 for maintaining the desired speed.

It will be understood that each of the elements described above, or two or more together, may also find a useful application in other types of construction differing from the types described above.

While the invention has been illustrated and described as embodied in a specific example of the hand tool, it is not intended to be limited to the details shown, since various modifications and structural changes may be made without departing in any way from the spirit of the present invention.

For example, the matrix 22 may include an additional pushbutton 220 indicated by S which upon actuation instructs the control circuit 27 to softly accelerate the speed of the electromotor to the desired volume. The control circuit 27 may further include a subunit which upon exceeding a preset speed or torque disconnects the power source 36 and there is provided an additional pushbutton 221 indicated by R which upon actuation enables a repeated connected of the electromotor to the power source. It may be also of advantage when the main switch 18 is not arranged in the matrix 22 but as usual in the form of a trigger 38 in the hand grip 14.

What is claimed as new and desired to be protected by Letters Patent is set forth in the appended claims:

1. An electrically driven hand-operated tool comprising a housing defining a handle and, within said housing, a driving electromotor and means for presetting and adjusting a plurality of modes of operation of said electromotor, said means including a plurality of control switches having their respective control elements arranged in a regular array located on a surface portion of said housing opposite said handle.

2. A tool as defined in claim 1, wherein said control elements of said switches are pushbuttons each provided with an illumination element which is activated upon actuation of the pushbutton.

3. An arrangement of an electrically driven hand-held tool comprising a housing defining a handle and, within said housing, a driving electric motor, switching and controlling means including a microprocessor, said means having a plurality of input lines and an output line, power control means connected between said electric motor and said output line, said switching and controlling means controlling different operational variables of said electric motor in response to activation of corresponding input lines, a part of said input lines controlling the selection of operational variables to be controlled and another part of said input lines controlling digital values of the selected operational variables, a plurality of control elements for activating said input lines, said control elements being arranged in a regular array on a top surface portion of said housing opposite said handle, and said switching and controlling means being preset to deliver a control signal at said output line when a control element pertaining to an operational variable and control elements pertaining to a digital value are actuated.

4. An arrangement as defined in claim 3, wherein said different operational variables are rotary speed and torque.

5. An arrangement as defined in claim 4, further including a tacho generator coupled between said electromotor and said microprocessor to generate an actual value signal of the preset speed.

6. An arrangement as defined in claim 4, wherein said array of control elements includes two pushbuttons connected to a relay for reversing the direction of rotation of said electromotor when actuated.

7. An arrangement as defined in claim 6, further including a relay for controlling transmission gears, said array of control elements including as many additional pushbuttons as many transmission positions are available and being connected to said relay for adjusting various transmission ratios.

* * * * *